US008606710B2

(12) United States Patent
Park

(10) Patent No.: US 8,606,710 B2
(45) Date of Patent: Dec. 10, 2013

(54) METHOD AND SYSTEM FOR PAYING PUBLIC TRANSPORTATION FARE VIA MOBILE DEVICE

(75) Inventor: Ki Hyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 13/280,857

(22) Filed: Oct. 25, 2011

(65) Prior Publication Data

US 2012/0101942 A1 Apr. 26, 2012

(30) Foreign Application Priority Data

Oct. 25, 2010 (KR) ........................ 10-2010-0103971

(51) Int. Cl.
G06Q 40/00 (2012.01)
(52) U.S. Cl.
USPC .................. 705/40; 370/352; 705/13; 705/21
(58) Field of Classification Search
None
See application file for complete search history.

(56) References Cited

U.S. PATENT DOCUMENTS

| 5,146,066 | A * | 9/1992 | Brun et al. ..................... 235/380 |
|---|---|---|---|
| 7,490,062 | B2 * | 2/2009 | Hansmann et al. .............. 705/39 |
| 7,890,371 | B2 * | 2/2011 | Chao ................................ 705/17 |
| 8,160,959 | B2 * | 4/2012 | Rackley et al. .................. 705/39 |
| 2001/0016835 | A1 * | 8/2001 | Hansmann et al. .............. 705/40 |
| 2002/0069165 | A1 * | 6/2002 | O'Neil ............................ 705/40 |
| 2003/0058842 | A1 * | 3/2003 | Bud ............................... 370/352 |
| 2005/0086164 | A1 * | 4/2005 | Kim et al. ........................ 705/40 |
| 2006/0259354 | A1 * | 11/2006 | Yan ................................. 705/13 |
| 2007/0100651 | A1 * | 5/2007 | Ramer et al. ...................... 705/1 |
| 2008/0010190 | A1 * | 1/2008 | Rackley, III et al. ............. 705/39 |
| 2008/0306828 | A1 * | 12/2008 | Chao ................................ 705/17 |
| 2009/0037286 | A1 * | 2/2009 | Foster .............................. 705/21 |
| 2009/0043647 | A1 * | 2/2009 | Hwang et al. .................... 705/13 |
| 2009/0098854 | A1 * | 4/2009 | Park et al. ....................... 455/407 |
| 2011/0246373 | A1 * | 10/2011 | Prakash et al. ................... 705/75 |
| 2011/0264583 | A1 * | 10/2011 | Cooper et al. ................... 705/40 |
| 2012/0078732 | A1 * | 3/2012 | Heller ........................ 705/14.73 |

FOREIGN PATENT DOCUMENTS

| KR | 10-2006-0118881 A | 11/2006 | |
|---|---|---|---|
| KR | 10-2007-0075763 A | 7/2007 | |
| KR | 20-2009-0002817 U | 3/2009 | |
| WO | WO 97/45814 | * 12/1997 | ............. G06F 17/60 |

OTHER PUBLICATIONS

Jerry Gao, Ph.D, Jackey Cai, Kiran Patel, Simon Shim, Ph.D., "A Wireless Payment System", San Jose State University, Computer Engineering, San Jose, USA,Proceedings of the 2005 second IEEE International Workshop on Mobile Commerce and Services (WMCS'05).*

* cited by examiner

*Primary Examiner* — Robert Niquette
(74) *Attorney, Agent, or Firm* — Jefferson IP Law, LLP

(57) ABSTRACT

A method and a system of paying a public transportation fare via a mobile device are provided. The method includes connecting the mobile device to an Access Point (AP) installed to a Transportation System (TS), transmitting a first message, from the TS to a Communication Service Providing Server (CSPS), including a list of mobile devices connected to the AP, including the mobile device, identification-information regarding the AP, and the current location information regarding the mobile device, transmitting, when the mobile device is disconnected from the AP, a second message, from the TS to the CSPS, including a list of mobile devices connected to the AP, excluding the mobile device, the identification-information regarding the AP, and the current location information regarding the TS, and calculating, by the CSPS, the transportation fare to charge the mobile device and transmitting a transportation fare charge message to the mobile device.

20 Claims, 10 Drawing Sheets

METHOD AND SYSTEM FOR PAYING PUBLIC TRANSPORTATION FARE VIA MOBILE DEVICE

PRIORITY

This application claims the benefit under 35 U.S.C. §119(a) of a Korean patent application filed on Oct. 25, 2010 in the Korean Intellectual Property Office and assigned Serial No. 10-2010-0103971, the entire disclosure of which is hereby incorporated by reference.

BACKGROUND OF THE INVENTION

1. Field of the Invention

The present invention relates to public transportation fare paying systems. More particularly, the present invention relates to a method and a system for paying public transportation fares via a Wireless-Fidelity (Wi-Fi) access function of a mobile device.

2. Description of the Related Art

People generally pay public transportation fare with transit cards or cash in order to board a public transportation system. For example, when people board a bus, they deposit cash into a slot of the public transportation fare collection box or touch their transit cards on a card recognition apparatus, in order to pay the public transportation fare. People must complete their payment after they board a bus, because the public transportation fare collection box and the card recognition apparatus are located near the entrance door of the bus. However, when many people are lined up to board a bus, most people following a person immediately boarding the bus must wait outside the bus until the person pays the public transportation fare on the bus. This inconveniences public transportation users. This problem is due to the payment place being restricted to a particular place in the bus where the payment apparatus is installed, for example, near the entrance door.

Therefore, a need exists for a method and a system for extending the range of payment place in a public transportation system and allowing users to easily pay their public transportation fare via their mobile devices.

SUMMARY OF THE INVENTION

Aspects of the present invention are to address at least the above-mentioned problems and/or disadvantages and to provide at least the advantages described below. Accordingly, an aspect of the present invention is to provide a method and a system for extending the range of payment place in a public transportation system and allow users to easily pay the public transportation fares via their mobile devices.

In accordance with an aspect of the present invention, a method for paying a public transportation fare via a mobile device is provided. The method includes connecting the mobile device to an Access Point (AP) installed to a transportation system, transmitting a first message from the transportation system to a communication service providing server, wherein the first message includes a list of mobile devices connected to the AP, including the mobile device, identification-information regarding the AP, and information regarding a location where the mobile device is currently located, concluding that the user of the mobile device has boarded the transportation system when the communication service providing server receives the first message, transmitting, when the mobile device is disconnected from the AP, a second message from the transportation system to the communication service providing server, wherein the second message includes a list of mobile devices connected to the AP, excluding the mobile device, the identification-information regarding the AP, and the current location information regarding the transportation system, concluding that the user of the mobile device has exited the transportation system when the communication service providing server receives the second message, and calculating, by the communication service providing server, the transportation fare to charge the mobile device and transmitting a transportation fare charge message to the mobile device.

In accordance with another aspect of the present invention, a method for paying a public transportation fare via a mobile device is provided. The method includes connecting the mobile device to an AP installed to a transportation system, transmitting a first message from the mobile device to a communication service providing server, wherein the first message includes the identification-information regarding the mobile device, identification-information regarding the AP, and information regarding a location where the mobile device is currently located, concluding, when the communication service providing server receives the first message, that the user of the mobile device has boarded the transportation system, transmitting, when the mobile device is disconnected from the AP, a second message from the mobile device to the communication service providing server, wherein the second message includes the identification-information regarding the mobile device, and the current location information regarding the mobile device, excluding the identification-information regarding the AP, concluding that the user of the mobile device has exited the transportation system when the communication service providing server receives the second message, and calculating, by the communication service providing server, the transportation fare to charge the mobile device and transmitting a transportation fare charge message to the mobile device.

In accordance with another aspect of the present invention, a method for paying a public transportation fare via a mobile device is provided. The method includes connecting the mobile device to an AP installed to a transportation system, transmitting a first message from the transportation system to a communication service providing server, wherein the first message includes a list of mobile devices connected to the AP, including the mobile device, identification-information regarding the AP, and information regarding a location where the transportation system is currently located, transmitting a second message from the mobile device to the communication service providing server, wherein the second message includes the identification-information regarding the mobile device, identification-information regarding the AP, and information regarding a location where the mobile device is currently located, concluding that the user of the mobile device has boarded the transportation system when the communication service providing server ascertains that the identification-information regarding the AP in the second message is identical to that in the first message, transmitting, when the mobile device is disconnected from the AP, a third message from the transportation system to the communication service providing server, wherein the third message includes a list of mobile devices connected to the AP, excluding the mobile device, the identification-information regarding the AP, and the current location information regarding the transportation system, transmitting a fourth message from the mobile device to the communication service providing server, wherein the fourth message includes the identification-information regarding the mobile device, and the current location information regarding the mobile device, excluding the identification-information regarding the AP, concluding that the user of the mobile device has exited the transportation system when the communication service providing server ascertains that the mobile device excluded from the list of mobile devices connected to the AP is identical to the mobile device that transmitted the fourth message excluding the identification-information regarding the AP, and calculating, by the communication service providing server, a transportation fare to charge the mobile device and transmitting a transportation fare charge message to the mobile device.

In accordance with another aspect of the present invention, a system for paying a public transportation fare is provided. The system includes a transportation system with an AP, a location measurement module, a wireless network communication module, a mobile device with a communication module for connecting to the AP, and a communication service providing server. The transportation system transmits a message to the communication service providing server when the transportation system arrives at a certain location, wherein the message comprises a list of mobile devices connected to the AP, identification-information regarding the AP, and the current location information regarding the transportation system. The communication service providing server ascertains that the user of the mobile device has boarded the transportation system when the mobile device is added to the list of mobile devices connected to the AP, ascertains that the user of the mobile device has exited the transportation system when the mobile device is removed from the list of mobile devices connected to the AP, detects the mobile device user's boarding and exiting locations via the current location, calculates the transportation fare to charge the mobile device via the user's boarding and exiting locations, and transmits the transportation fare payment message to the mobile device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
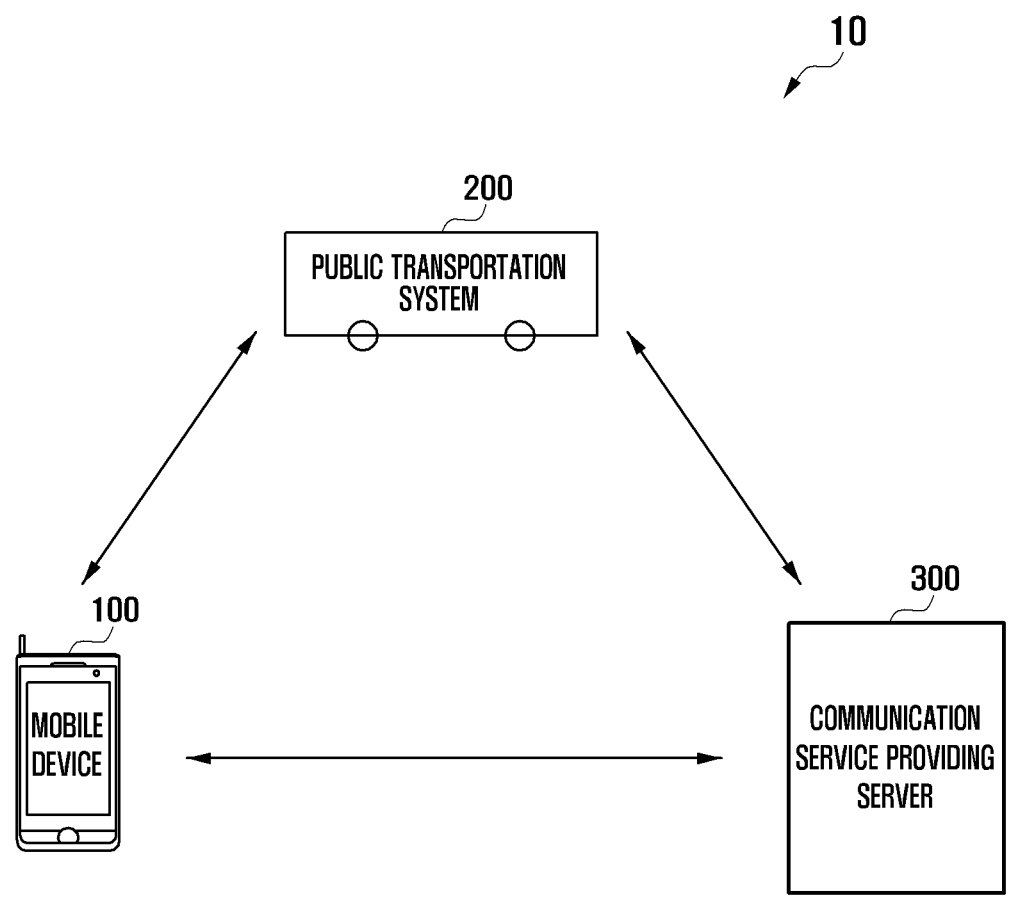
FIG. 1 illustrates a schematic block diagram of a public transportation fare payment system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention proposed herein relate to a mobile device that can be applied to all information communication devices, multimedia devices, and their applications, for example, a Global System for Mobile communication (GSM) terminal, a Universal Mobile Telecommunication Service (UMTS) terminal, a Code Division Multiple Access (CDMA) terminal, a Wideband Code Division Multiple Access (WCDMA) terminal, an International Mobile Telecommunication 2000 (IMT-2000) terminal, a General Packet Radio Service (GPRS) terminal, etc.

FIGS. 1 through 10, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 illustrates a schematic block diagram of a public transportation fare payment system according to an exemplary embodiment of the present invention.

Referring to FIG. 1, a system 10 includes a mobile device 100, a transportation system 200 and a communication service providing server 300.

The mobile device 100 according to an exemplary implementation includes a wireless network communication module for connecting with a wireless network, and a short-range communication module for connecting with an Access Point (AP) installed to the transportation system 200. The short-range communication module may be implemented with a Wireless-Fidelity (Wi-Fi) communication module. The mobile device 100 may further include a module for measuring a location where it is currently located. The location measurement module may be implemented with a Global Positioning System (GPS) module. The mobile device 100 may only employ a GPS module by itself in order to measure its current location. Alternatively, the mobile device 100 can detect its current location by using a GPS and a wireless network based Assisted-GPS (A-GPS).

When the mobile device 100 is connected to an AP of the transportation system 200, it transmits, to a communication service providing server 300, a message that includes the identification-information regarding the AP, e.g., a MAC address, its current location information, and its identification-information, e.g., a phone number. When the mobile device 100 is disconnected from the AP, it transmits, to a communication service providing server 300, a message that includes its current location information and its identification-information. When the mobile device 100 is disconnected from the AP, the message transmitted to the communication service providing server 300 further includes information indicating the disconnection of the mobile device 100 from the AP.

The transportation system 200 refers to public transportation, such as a bus, a subway, a taxi, etc. The transportation system 200 includes an AP, a wireless network module, and a location measurement module. The transportation system 200 creates a list of mobile devices connected to the AP, using identification-information regarding the mobile device 100. The transportation system 200 detects its current location via the location measurement module. When the transportation system 200 ascertains that it has arrived at a certain location, e.g., a stop, it creates a message that includes identification-information regarding the AP, a list of mobile devices connected to the AP, and its current location information, and transmits the message to the communication service providing server 300. It is preferable that the AP is equipped with a radiation antenna allowing for the connection radius limited to the connection coverage area. The transportation system 200 may include only an AP, and not a wireless network module or a location measurement module.

The communication service providing server 300 calculates the transportation fare and charges the mobile device 100 the fare. Each time that the transportation system 200 arrives at a stop, the communication service providing server 300 receives, from the transportation system 200, a message that includes a list of mobile devices connected to the AP, identification-information regarding the AP, and current location information regarding the transportation system 200. The communication service providing server 300 determines whether a user with the mobile device 100 boards the transportation system 200 via the list of mobile devices connected to the AP. When the communication service providing server 300 receives the message from the transportation system 200 and ascertains that the list of mobile devices connected to the AP is updated to include a new mobile device 100, it concludes that the user of the mobile device 100 boards the transportation system 200 at a stop where the transportation system 200 is currently located, at the time point that it received the message. On the contrary, when the communication service providing server 300 receives the message from the transportation system 200 and ascertains that the list of mobile devices connected to the AP is updated to remove the mobile device 100, it concludes that the user of the mobile device 100 exits the transportation system 200 at a stop where the transportation system 200 is currently located, at the time point that it received the message. The communication service providing server 300 calculates the transportation fare to charge the mobile device 100, via the mobile device user's boarding location and exiting location.

In an exemplary implementation, the communication service providing server 300 may also calculate the transportation fare to charge the mobile device 100, via a message transmitted from the mobile device 100. When the mobile device 100 is connected to the AP installed to the transportation system 200, it transmits, to the communication service providing server 300, a message that includes its identification-information, the identification-information regarding the AP, and its current location information. When the communication service providing server 300 receives the message from the mobile device 100, it concludes that the user of the mobile device 100 has boarded the transportation system 200 at a location corresponding to the current location information regarding the transportation system 200, at the time point that it received the message. On the contrary, when the mobile device 100 is disconnected from the AP, it transmits, to the communication service providing server 300, a message that includes its identification-information and its current location information, excluding the identification-information regarding the AP. When the communication service providing server 300 receives the message from the mobile device 100, it concludes that the user of the mobile device 100 exits the transportation system 200 at a stop corresponding to the current location information regarding the mobile device 100, at the time point that it received the message. The communication service providing server 300 calculates the transportation fare to charge the mobile device 100, via the mobile device user's boarding and exiting locations.

When the communication service providing server 300 detects that the user of the mobile device 100 has boarded the transportation system 200, it calculates the time difference between a time point that the user exited another form of transportation and a time point that the user boarded the transportation system 200. When the communication service providing server 300 ascertains that the time difference is equal to or less than a preset period of time, it concludes that the user has transferred from another form of transportation to the transportation system 200. In that case, the communication service providing server 300 can calculate his/her transportation fare, by applying the transfer transportation fare rate thereto.

Figure 2:
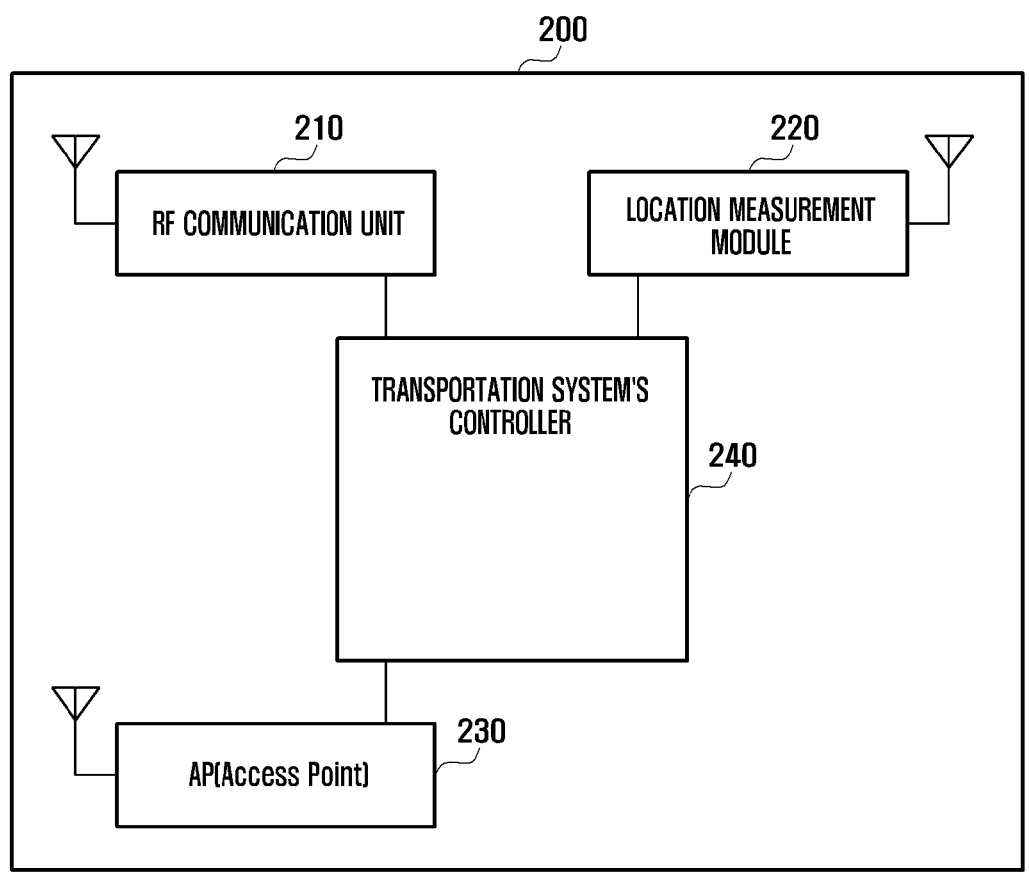
FIG. 2 illustrates a schematic block diagram of a public transportation system according to an exemplary embodiment of the present invention.

FIG. 2 illustrates a schematic block diagram of a public transportation system according to an exemplary embodiment of the present invention.

Referring to FIG. 2, the transportation system 200 includes a Radio Frequency (RF) communication unit 210, a location measurement module 220, an AP 230, and a transportation system's controller 240.

The RF communication unit 210 transmits/receives wireless communication data for the transportation system 200 to/from external systems. The RF communication unit 210 includes an RF transmitter for up-converting the frequency of signals to be transmitted and amplifying the signals and an RF receiver for low-noise amplifying received RF signals and down-converting the frequency of the received RF signals. The RF communication unit 210 receives data via a wireless channel and outputs it to the transportation system's controller 240. The RF communication unit 210 also transmits data, output from the transportation system's controller 240, via the wireless channel. The RF communication unit 210 can transmit, to the communication service providing server 300, a message that includes identification-information regarding the AP, a list of mobile devices connected to the AP, formed by identification-information regarding mobile devices connected to the AP, and the current location information regarding the transportation system 200.

The location measurement module 220 measures the current location of the transportation system 200. In an exemplary implementation, the location measurement module 220 is implemented with a GPS module. The location measurement module 220 detects the current time information and the current location information of the transportation system 200, and transmits it to the transportation system's controller 240.

The AP 230 connects a wired Local Area Network (LAN) and a wireless LAN. The AP 230 provides a wireless network to the mobile device 100. The AP 230 broadcasts a beacon signal including the identification-information, i.e., a MAC address. In that case, the mobile device 100 receives the beacon signal via the Wi-Fi module, thereby connecting with the AP 230. Alternatively, the mobile device 100 may broadcast a probe request signal to search for APs close thereto. When an AP 230 receives the request signal and transmits the probe response signal with the MAC address to the mobile device 100, the mobile device 100 can connect with the AP 230. In that case, the AP 230 stores the identification-information regarding the mobile device 100. Similarly, the mobile device 100 may store the identification-information regarding the AP 230. In an exemplary implementation, the AP 230 stores a list of mobile devices connected to the AP 230, formed by the identification-information regarding mobile devices connected to the AP 230. The AP 230 updates the list of mobile devices connected thereto, each time that a mobile device is connected thereto or a connected mobile device is disconnected therefrom.

The transportation system's controller 240 controls operations of the transportation system 200, related to the transportation fare. The transportation system's controller 240 controls the location measurement module 220 to measure a location where the transportation system 200 is currently located. When the transportation system's controller 240 ascertains that the transportation system 200 has arrived at a certain location (e.g., a stop), it creates a message and transmits it to the communication service providing server 300 via the RF communication unit 210. The message includes a list of mobile devices connected to the AP 230, information regarding a current location of the transportation system 200, and identification-information regarding the AP 230.

Figure 3:
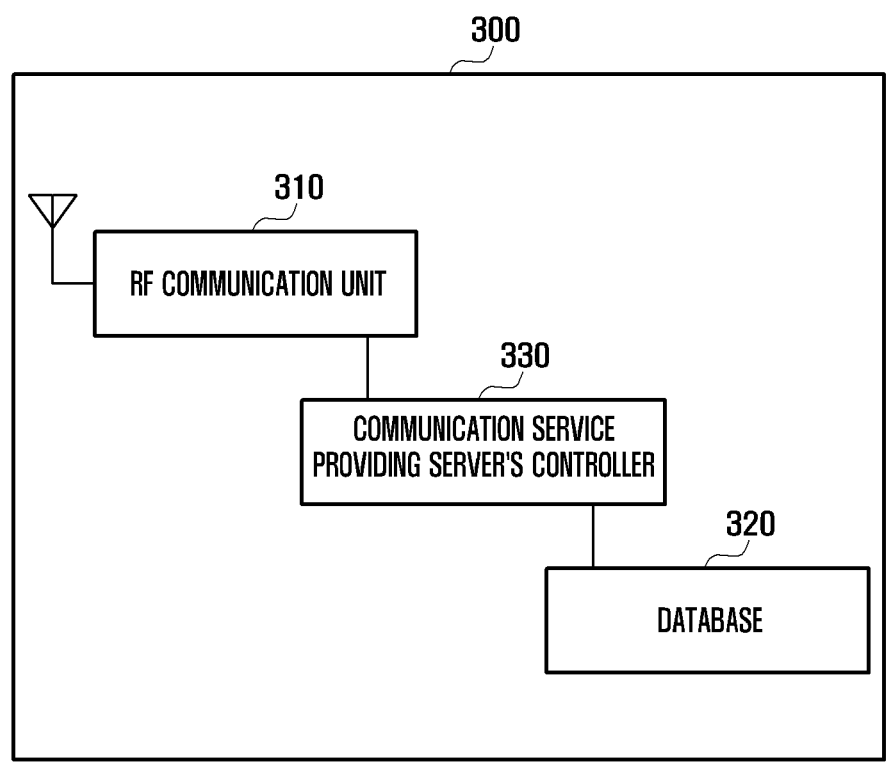
FIG. 3 illustrates a schematic block diagram of a communication service providing server according to an exemplary embodiment of the present invention.

FIG. 3 illustrates a schematic block diagram of a communication service providing server according to an exemplary embodiment of the present invention.

Referring to FIG. 3, a server 300 includes an RF communication unit 310, a database 320, and a communication service providing server's controller 330.

The RF communication unit 310 transmits/receives wireless communication data for the communication service providing server 300 to/from external systems. In an exemplary implementation, the RF communication unit 310 receives a message from the transportation system 200. The message includes a list of mobile devices connected to the AP 230, formed by the identification-information regarding mobile devices connected to the AP 230, information regarding a current location of the transportation system 200, and identification-information regarding the AP 230. The RF communication unit 310 transmits a message confirming that the transportation fare has been charged to the mobile device 100.

The database 320 stores the current location information regarding a mobile device, and information as to whether the user of the mobile device boards the transportation system. The database 320 stores a list of mobile devices of subscribers who have subscribed to communication services, current location information regarding respective mobile devices, information regarding transportation systems the subscribers have used, information regarding subscribers' boarding or exiting locations, time information regarding subscribers' boarding or exiting times, and information as to whether subscribers have transferred to another form of transportation. In an exemplary implementation, the database 320 may store a list of forms of transportation to which APs are installed, wherein the transportation list includes a list of mobile devices connected to the AP, with respect to the transportation, and current location information of the mobile devices.

The communication service providing server's controller 330 controls operations of the communication service providing server 300, related to the transportation fare. The server's controller 330 receives a message from the transportation system 200 via the RF communication unit 310, and updates the database 320 according to the message. The message includes a list of mobile devices connected to the AP 230, information regarding a current location of the transportation system 200, and identification-information regarding the AP 230. The server's controller 330 updates current location information regarding all mobile devices included in the list of mobile devices connected to the AP, information regarding transportation that the subscribers have used, information regarding subscribers' boarding or exiting locations, time information regarding subscribers' boarding or exiting times, and information as to whether subscribers have transferred transportation.

The server's controller 330 analyzes the message from the transportation system 200. When the server's controller 330 ascertains that a mobile device 100 is newly added to a list of mobile devices connected to the AP 230, it concludes that the user of the mobile device 100 boarded the transportation system 200 at a location corresponding to the current location information regarding the transportation system 200, at the time point that it received the message. On the contrary, when the server's controller 330 ascertains that a mobile device 100 is removed from a list of mobile devices connected to the AP 230, it concludes that the user of the mobile device 100 exited the transportation system 200 at a location corresponding to the current location information regarding the transportation system 200, at the time point that it received the message. The server's controller 330 calculates the transportation fare of the mobile device 100 via the user's boarding and exiting locations, creates the transportation fare charge message including information regarding the calculated transportation fare, and transmits it to the mobile device 100 via the RF communication unit 310.

When the server's controller 330 detects that the user of the mobile device 100 has boarded the transportation system 200, it determines a time point where the user of the mobile device 100 exited another form of transportation via the database 320, compares it with a time point that the user boarded the transportation system 200, and calculates the time difference. When the server's controller 330 ascertains that the time difference is within a preset period of time (e.g., 30 minutes), it concludes that the user has transferred to the transportation system 200. In that case, the server's controller 330 applies the transfer transportation fare rate to the calculation of transportation fare of the mobile device 100.

The mobile device 100 includes a short-range communication module that can connect with an AP 230 installed to the transportation system 200. The mobile device 100 transmits identification-information regarding the mobile device 100 to the transportation system 200, while connecting with the AP 230 of the transportation system 200.

Figure 4:
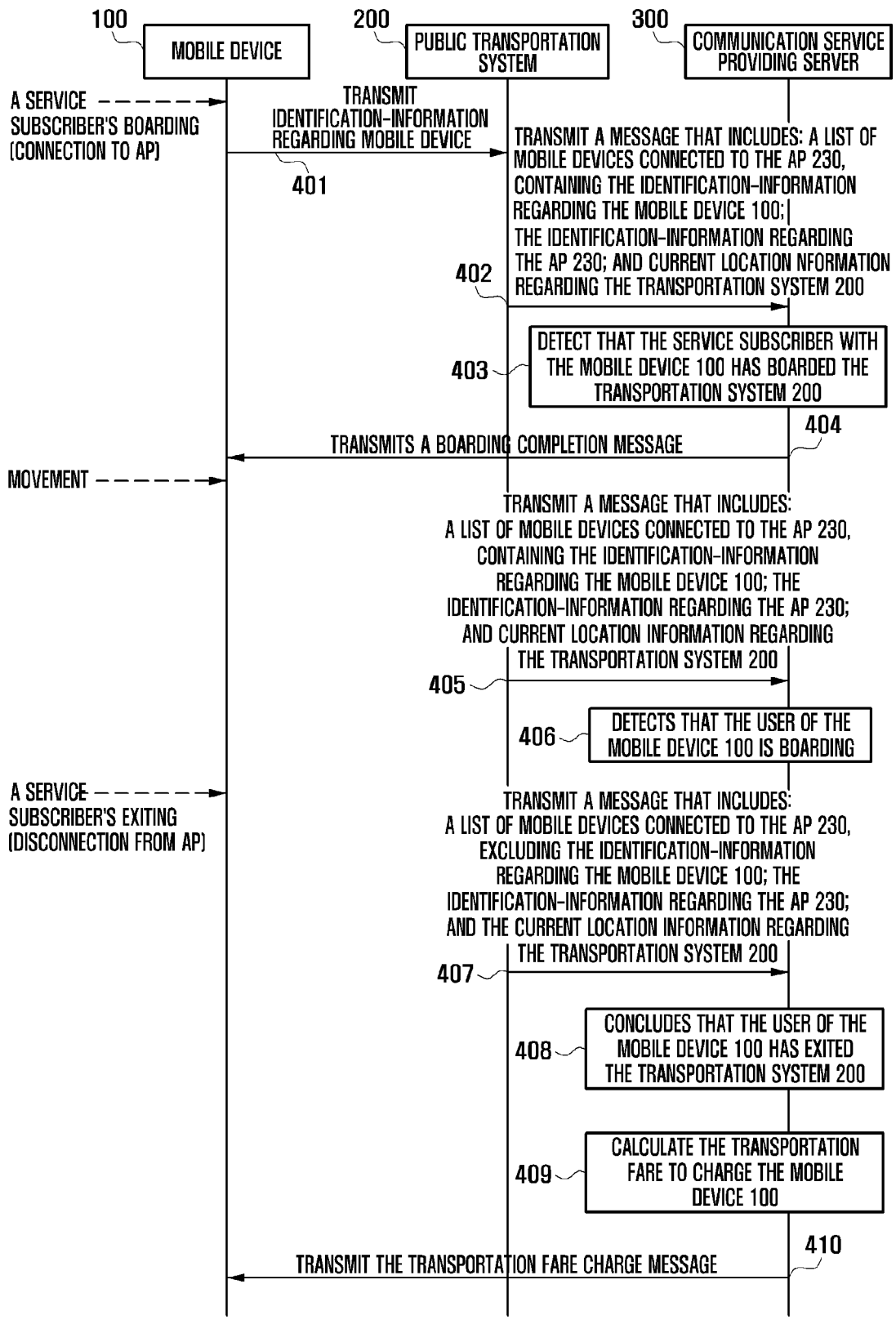
FIG. 4 illustrates a signal flowchart of a public transportation fare payment method according to an exemplary embodiment of the present invention.

FIG. 4 illustrates a signal flowchart of a public transportation fare payment method according to an exemplary embodiment of the present invention.

Referring to FIG. 4, when a user who has subscribed to a communication service and possesses a mobile device 100, i.e., a service subscriber, boards a transportation system 200, the mobile device 100 transmits the identification-information to the transportation system 200 at step 401. The mobile device 100 controls the short-range communication module to connect with an AP 230 installed to the transportation system 200. In the process of connection to the AP 230, the mobile device 100 transmits the identification-information to the transportation system 200, and in response thereto, the transportation system 200 transmits the identification-information regarding the AP 230 to the mobile device 100.

The transportation system 200 transmits, to a communication service providing server 300, a message that includes a list of mobile devices connected to the AP 230, including the identification-information regarding the mobile device 100, the identification-information regarding the AP 230, and current location information regarding the transportation system 200 at step 402. That is, each time the transportation system 200 arrives at certain locations (e.g., stops), it transmits, to a communication service providing server 300, a message that includes a list of mobile devices connected to the AP 230, the identification-information regarding the AP 230, and current location information regarding the transportation system 200. Since the mobile device 100 has been connected to the AP 230 of the transportation system 200, its identification-information is included in the list of mobile devices connected to the AP 230. The transportation system 200 can transmit the message to the communication service providing server 300 at time points when it arrives at and departs from a stop, respectively.

The communication service providing server 300 detects that the service subscriber with the mobile device 100 has boarded the transportation system 200, via the message transmitted from the transportation system 200 at step 403. The server 300 repeatedly receives the message from the transportation system 200 and analyzes the list of mobile devices connected to the AP 230, included in the message. When the server 300 ascertains that the list additionally includes identification-information regarding the mobile device 100, it detects that the service subscriber with the mobile device 100 has boarded the transportation system 200 at a stop corresponding to current location information regarding the transportation system 200, included in the message, at a time point that it received the message.

When the communication service providing server 300 receives a message that the transportation system 200 transmits when departing from a stop, and ascertains that the mobile device 100 is added to the list of mobile devices connected to the AP 230, it concludes that the service subscriber of the mobile device 100 has boarded the transportation system 200 at the stop corresponding to the current location information regarding the transportation system 200, included in the message.

When the communication service providing server 300 receives a message that the transportation system 200 transmits when arriving at a stop, and ascertains that the mobile device 100 is added to the list of mobile devices connected to the AP 230, it concludes that the service subscriber of the mobile device 100 has boarded the transportation system 200 at an earlier stop than the stop corresponding to the current location information regarding the transportation system 200, included in the message.

The communication service providing server 300 may conclude that the user of the mobile device 100 has boarded or exited the transportation system 200 at a time point that it received a message from the transportation system 200. The message transmitted from the transportation system 200 to the server 300 may include times of the user boarding and exiting the transportation system 200 (i.e., times of the mobile device 100 connecting to and disconnecting from the AP 230 of the transportation system 200). Therefore, the communication service providing server 300 can detect the mobile device user's boarding and exiting times via the message.

When the communication service providing server 300 ascertains that the mobile device user has boarded the transportation system 200, it compares the mobile device user's boarding time with a time of the mobile device user exiting another form of transportation. When the server 300 detects that the time difference is within a preset period of time (e.g., 30 minutes), it concludes that the mobile device user has transferred another form of transportation to the transportation system 200.

The communication service providing server 300 transmits a boarding completion message to the mobile device 100 at step 404. The boarding completion message may include a boarding location, a boarding time, information as to whether a mobile device user transfers, and a message asking a mobile device user whether to make a decision to board a transportation system. When the mobile device user has made a decision to board the transportation system, the mobile device 100 transmits, to the server 300, a message indicating the user's boarding decision. When the server 300 receives the message, it can conclude that the mobile device user has boarded the transportation system 200. On the contrary, when the server 300 does not receive the message, it can conclude that the mobile device user has not boarded the transportation system 200.

When the transportation system 200 moves to a next stop, it transmits a message to the communication service providing server 300 each time that it arrives at and departs from stops at step 405. The message includes a list of mobile devices connected to the AP 230, including identification-information regarding mobile devices, identification-information regarding the AP 230, and current location information regarding the transportation system 200. Since the user of the mobile device 100 is boarding the transportation system 200 and simultaneously the mobile device 100 is being connected to the AP 230 of the transportation system 200, the transportation system 200 continues to transmit, to the communication service providing server 300, the list of mobile devices connected to the AP 230 including the identification-information regarding the mobile device 100.

The communication service providing server 300 detects that the user of the mobile device 100 is boarding the transportation system 200, via the message transmitted from the transportation system 200 at step 406. That is, the server 300 ascertains that the list of mobile devices connected to the AP 230 includes the mobile device 100, and concludes that the user of the mobile device 100 is boarding the transportation system 200. The current location information regarding the transportation system 200 is continuously altered each time the transportation system 200 moves. In that case, the server 300 updates the current location of the mobile device 100 in the database, by reflecting the current location information regarding the transportation system 200.

When the user of the mobile device 100 exits the transportation system 200, a disconnection is made between the mobile device 100 and the AP 230 of the transportation system 200. In that case, the transportation system 200 transmits, to the communication service providing server 300, a message that includes a list of mobile devices connected to the AP 230, excluding the identification-information regarding the mobile device 100, the identification-information regarding the AP 230, and the current location information regarding the transportation system 200 at step 407. In a case where the transportation system 200 transmits a message to the server 300 around the time that it arrives at a stop, it transmits, to the server 300, a list of mobile devices connected to the AP 230, including the identification-information regarding the mobile device 100, at the current stop, and a list of mobile devices connected to the AP 230, excluding the identification-information regarding the mobile device 100, at the next stop. In a case where the transportation system 200 transmits a message to the server 300 at a time point that it departs from a stop, it transmits, to the server 300, a list of mobile devices connected to the AP 230, excluding the identification-information regarding the mobile device 100, at the current stop.

The communication service providing server 300 concludes that the user of the mobile device 100 has exited the transportation system 200, via the message transmitted from the transportation system 200 at step 408. In a case where the transportation system 200 transmits a message to the server 300 at a time point that it arrives at a stop, the server 300 concludes that the user of the mobile device 100 has exited the transportation system at an earlier stop than the current stop corresponding to the current location information regarding the transportation system 200, included in the message transmitted from the transportation system 200. Similarly, in a case where the transportation system 200 transmits a message to the server 300 at a time point that it departs from a stop, the server 300 concludes that the user of the mobile device 100 has exited the transportation system at the stop corresponding to the current location information regarding the transportation system 200, included in the message transmitted from the transportation system 200.

The communication service providing server 300 calculates the transportation fare to charge the mobile device 100, via the locations of the mobile device user boarding and exiting the transportation system 200 at step 409. In a case where the user of the mobile device 100 transfers from one transportation system to another, the server 300 can calculate the transportation fare to charge the mobile device 100, by applying the transfer transportation fare rate thereto.

The communication service providing server 300 creates the transportation fare charge message based on the calculated transportation fare, and transmits it to the mobile device 100 at step 410. The user of the mobile device 100 can determine and pay the transportation fare, via the message.

Figure 5:
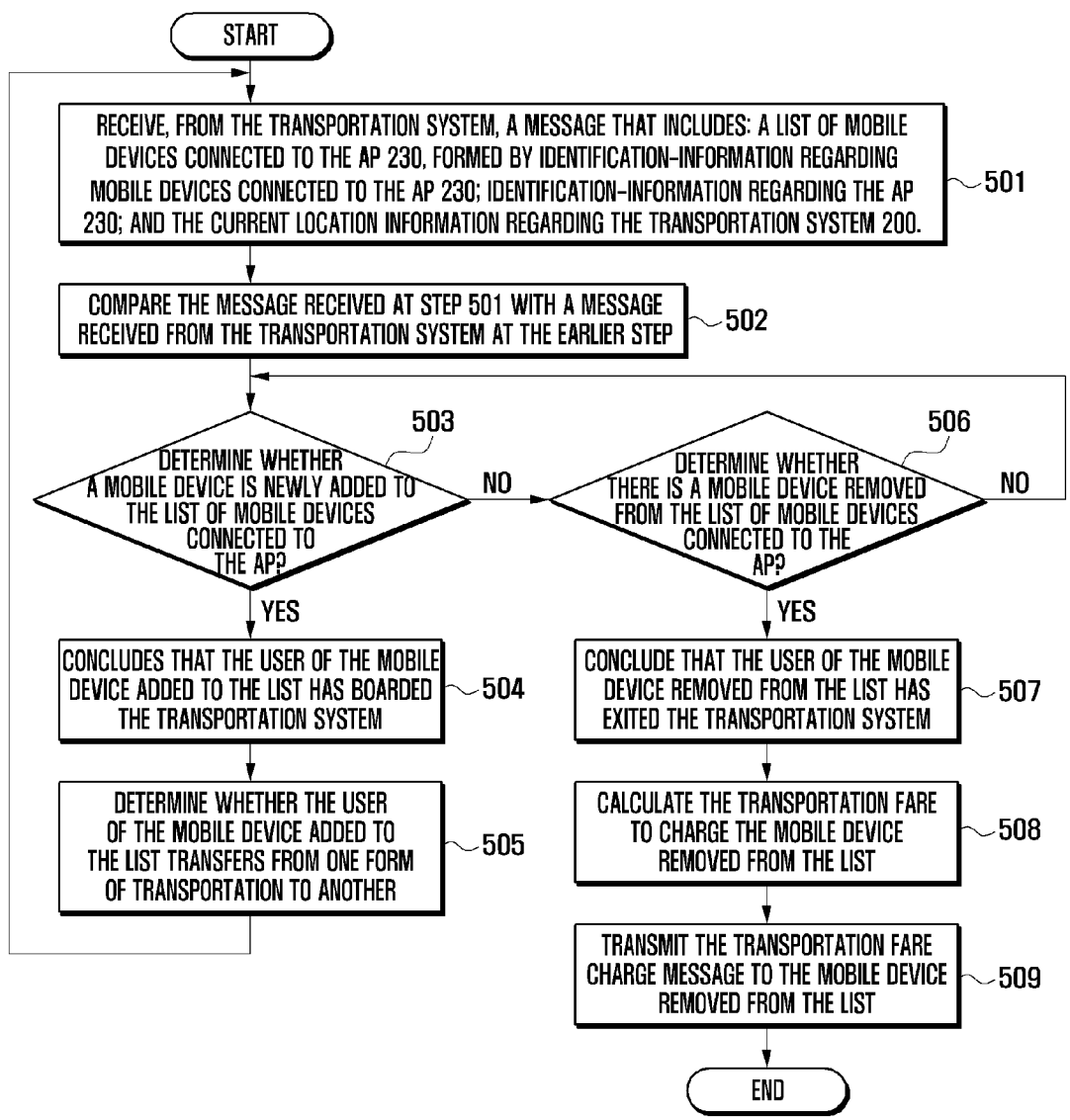
FIG. 5 illustrates a flowchart of a communication service providing server of a public transportation fare payment method according to an exemplary embodiment of the present invention.

FIG. 5 illustrates a flowchart of a communication service providing server of a public transportation fare payment method according to an exemplary embodiment of the present invention.

Referring to FIG. 5, the controller 330 of the communication service providing server 300, short for a server's controller, receives, via the RF communication unit 310, from the transportation system 200, a message that includes a list of mobile devices connected to the AP 230, formed by identification-information regarding mobile devices connected to the AP 230, identification-information regarding the AP 230, and the current location information regarding the transportation system 200 at step 501.

At step 502, the server's controller 330 compares the message received at step 501 with a message received at the earlier step from the transportation system 200. The database 320 of the communication service providing server 300 classifies and stores messages transmitted from the transportation systems. The server's controller 330 searches for a transportation system corresponding to an AP from the database 320 and a message transmitted from the transportation system. The server's controller 330 compares a list of mobile devices connected to the AP 230, included in the message received at step 501, with that in a message received at an earlier step immediately preceding the step.

At step 503, the server's controller 330 determines whether a mobile device is included in the list of mobile devices connected to the AP 230 received at step 501. For example, when a list of mobile devices connected to the AP 230, included in the message received at step 501, includes mobile devices A, B, C, and D, and a list included in the message received immediately before step 501 includes mobile devices B, C and D, the server's controller 330 concludes that mobile device A is newly added to the list.

When the server's controller 330 ascertains that a mobile device is newly included in the list of mobile devices connected to the AP 230 at step 503, it concludes that the user of the mobile device added to the list has boarded the transportation system 200 at step 504. That is, the server's controller 330 concludes that the user of the mobile device added to the list has boarded the transportation system 200 at a stop corresponding to the current location information regarding the transportation system 200, included in the message received at step 501. Alternatively, the server's controller 330 concludes that the user of the mobile device added to the list has boarded the transportation system 200 at a time point that it received the message from the transportation system 200.

Thereafter, the server's controller 330 determines whether the user of the mobile device added to the list transfers from one form of transportation to another at step 505. The database 320 stores boarding times, exiting times, information regarding transportation systems that the user boarded, current location information regarding the transportation system, etc., with respect to respective mobile devices. The server's controller 330 compares a time point that a mobile device user exits another form of transportation with a time point that the mobile device user boards the transportation system 200, and acquires the time difference. When the server's controller 330 ascertains that the time difference is within a preset period of time, it concludes that the mobile device user transfers to the transportation system 200. Thereafter, the server's controller 330 proceeds with step 501 and receives a message from the transportation system 200.

On the contrary, when the server's controller 330 ascertains that a mobile device is not included in the list of mobile devices connected to the AP 230, at step 503, it determines whether there is a mobile device removed from a list of mobile devices connected to the AP 230 at step 506. That is, the server's controller 330 compares the message received at step 501 with a message received preceding the step, and determines whether there is a mobile device removed from a list of mobile devices connected to the AP 230, included in the message received before the step 501.

When the server's controller 330 ascertains that there is a mobile device removed from a list of mobile devices connected to the AP 230 at step 506, it concludes that the user of the mobile device removed from the list has exited the transportation system at step 507. That is, the server's controller 330 concludes that the user of the mobile device removed from the list has exited the transportation system at a stop corresponding to the current location information regarding the transportation system 200, included in the message transmitted from the transportation system 200. Alternatively, the server's controller 330 concludes that the user of the mobile device removed from the list has exited the transportation system at a time point that it received the message from the transportation system 200.

Thereafter, the server's controller 330 calculates the transportation fare to charge the mobile device removed from the list at step 508. That is, the server's controller 330 detects locations where the user of the mobile device removed from the list has boarded and exited the transportation system, and calculates the transportation fare to charge the mobile device, considering the distance or the number of stops between the user's boarding and exiting locations.

The server's controller 330 controls the RF communication unit 310 to transmit the transportation fare charge message to the mobile device removed from the list at step 509. The mobile device 100 receives the transportation fare charge message and pays the transportation fare.

Meanwhile, when the server's controller 330 ascertains that there is no mobile device removed from a list of mobile devices connected to the AP 230 at step 506, it returns to and proceeds with step 503.

As described above, according to the exemplary implementation of a public transportation fare payment method, the transportation system transmits the list of mobile devices connected to the AP to the communication service providing server 300 each time that it passes by stops. In that case, the server compares lists of mobile devices connected to the AP between the arrival and departure of the transportation system, and determines whether a user of a mobile device has boarded or exited the transportation system. Since the server can detect the user's boarded or exited locations, it can calculate the transportation fare to charge the mobile device.

Figure 6:
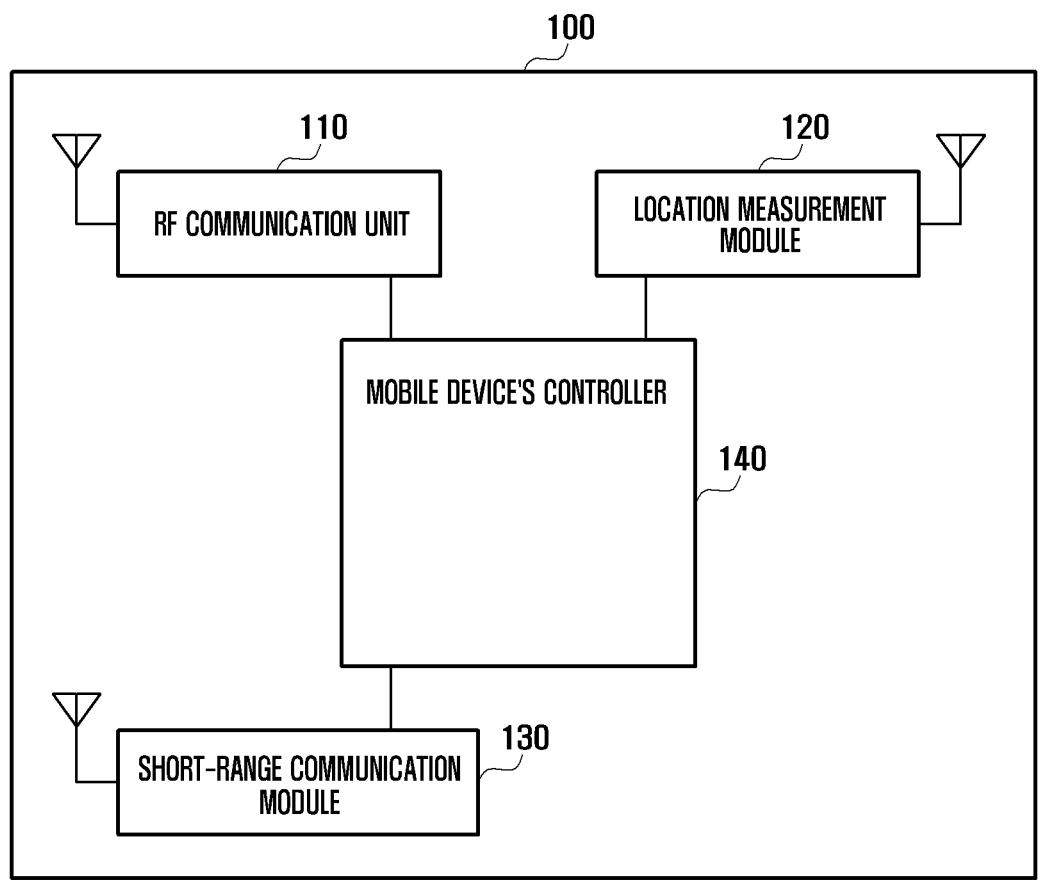
FIG. 6 illustrates a schematic block diagram of a mobile device according to an exemplary embodiment of the present invention.

FIG. 6 illustrates a schematic block diagram of a mobile device according to an exemplary embodiment of the present invention.

Referring to FIG. 6, the mobile device 100 includes an RF communication unit 110, a location measurement module 120, a short-range communication module 130, and a controller 140.

The RF communication unit 110 performs the transmission/reception of data for wireless communication to/from external systems. The RF communication unit 110 transmits, to the communication service providing server 300, a message that includes the identification-information regarding the mobile device 100, identification-information regarding an AP that the mobile device 100 connects with, and the current location information regarding the mobile device 100.

The location measurement module 120 measures a location where the mobile device 100 is currently located. The module 120 may be implemented with a GPS module.

The short-range communication module 130 makes a connection with the AP 230 installed to the transportation system 200. The module 130 may be implemented with a Wi-Fi module.

The controller 140 controls operations of the mobile device 100, hereinafter called a mobile device's controller 140. When the mobile device 100 is connected to the AP 230 of the transportation system 200, via the short-range communication module 130, the mobile device's controller 140 controls the RF communication unit 110 to transmit, to the communication service providing server 300, a message that includes the identification-information regarding the mobile device 100, identification-information regarding an AP that the mobile device 100 connects with, and the current location information regarding the mobile device 100. On the contrary, when the mobile device's controller 140 detects the disconnection of the short-range communication module 130 from the AP 230, it controls the RF communication unit 110 to transmit, to the communication service providing server 300, a message that includes the identification-information regarding the mobile device 100, and the current location information regarding the mobile device 100, excluding the identification-information regarding an AP that the mobile device 100 connects with. In an exemplary implementation, when the mobile device's controller 140 detects the disconnection of the short-range communication module 130 from the AP 230, it can transmit, via the RF communication unit 110, to the server 300, a message that includes information indicating that the mobile device 100 is disconnected from the AP 230, the identification-information regarding the mobile device 100, and the current location information regarding the mobile device 100. In addition, the mobile device's controller 140 controls the location measurement module 120 to measure a current location of the mobile device 100 in real time. When the mobile device's controller 140 ascertains that the mobile device 100 arrives at a certain location (e.g., a stop), it controls the RF communication unit 110 to transmit, to the server, a message that includes the identification-information regarding the mobile device 100, the identification-information regarding an AP that the mobile device 100 connects with, and the current location information regarding the mobile device 100.

In an exemplary implementation, the transportation system 200 includes an AP 230. The transportation system 200 can transmit identification-information regarding the AP 230 to the mobile device 100 when the mobile device 100 is connected to the AP 230.

The communication service providing server 300, as shown in FIG. 3, includes an RF communication unit 310, a database 320, and a communication service providing server's controller 330. When the server 300 receives, via the RF communication unit 310, from the mobile device 100, a message that includes the identification-information regarding the mobile device 100, identification-information regarding an AP 230 installed to the transportation system 200 that the mobile device 100 connects with, and the current location information regarding the mobile device 100, the server's controller 330 concludes that the user of the mobile device 100 has boarded the transportation system 200. On the contrary, when the server's controller 330 receives, from the mobile device 100, a message that includes the identification-information regarding the mobile device 100, and the current location information regarding the mobile device 100, excluding the identification-information regarding an AP 230, or a message that includes information indicating that the mobile device 100 is disconnected from the AP 230, the identification-information regarding the mobile device 100, and the current location information regarding the mobile device 100, it concludes that the user of the mobile device 100 has exited the transportation system 200.

Figure 7:
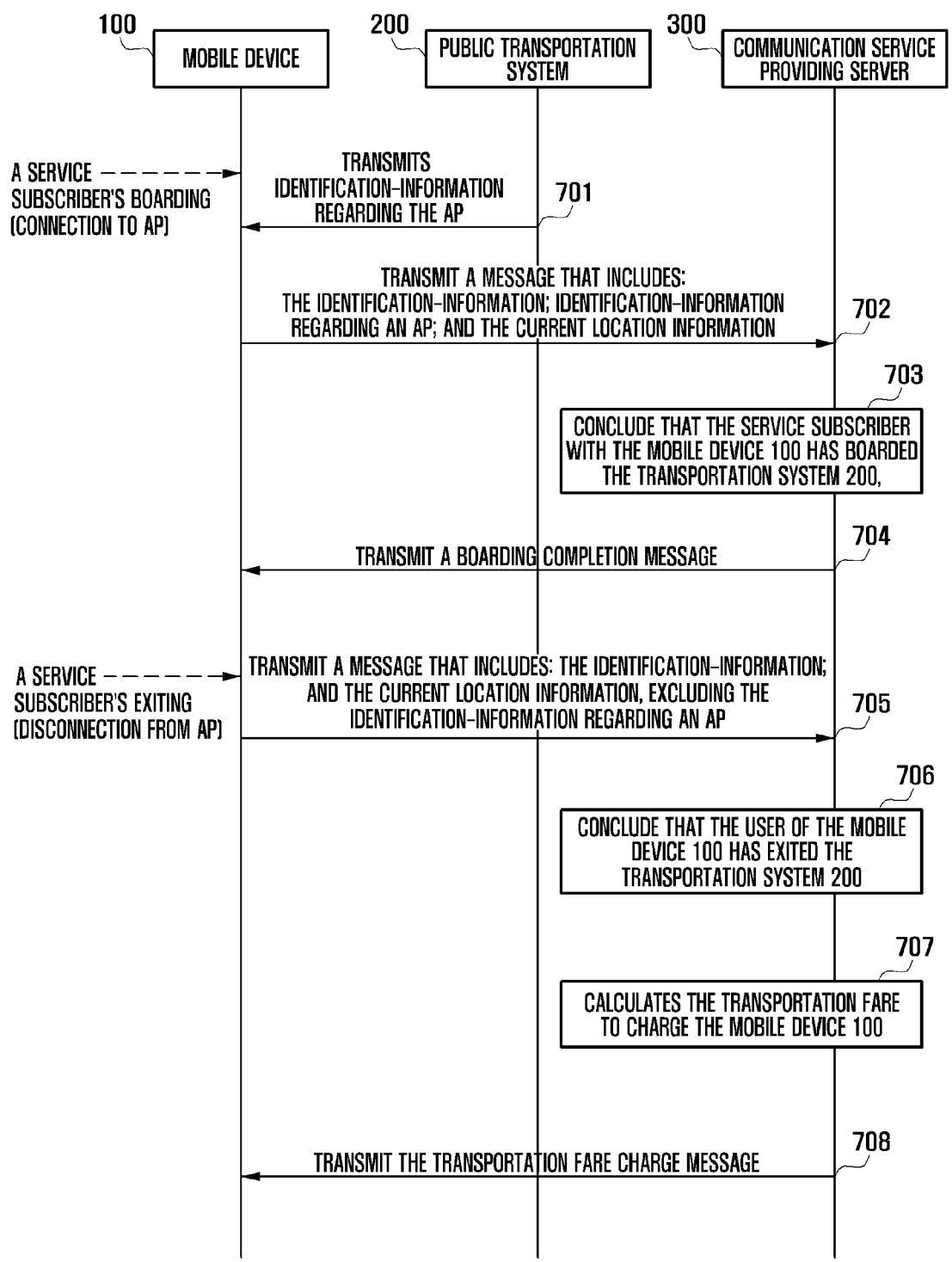
FIG. 7 illustrates a signal flowchart of a public transportation fare payment method according to an exemplary embodiment of the present invention.

FIG. 7 illustrates a signal flowchart of a public transportation fare payment method according to an exemplary embodiment of the present invention.

Referring to FIG. 7, when a user who has subscribed to a communication service and possesses a mobile device 100, i.e., a service subscriber, boards a transportation system 200, the transportation system 200 transmits identification-information regarding the AP 230 to the mobile device 100 at step 701. The mobile device 100 controls the short-range communication module to connect with the AP 230. In addition, the mobile device 100 also transmits the identification-information to the transportation system 200, and in response thereto, the transportation system 200 transmits the identification-information regarding the AP 230 to the mobile device 100.

The mobile device 100 transmits, to a communication service providing server 300, a message that includes the identification-information regarding the mobile device 100, identification-information regarding an AP 230, and the current location information regarding the mobile device 100 at step 702. That is, the mobile device 100 transmits the message to the server 300 at a time point that it is connected to the AP 230.

The communication service providing server 300 concludes that the service subscriber with the mobile device 100 has boarded the transportation system 200, via the message transmitted from the mobile device 100 at step 703. The server 300 receives and analyzes the message from the mobile device 100, and searches, from the database 320, for the transportation system 200 corresponding to the identification-information regarding the AP 230. When the server 300 has searched for the transportation system 200, it concludes that the service subscriber with the mobile device 100 has boarded the transportation system 200 at a stop corresponding to current location information regarding the transportation system 200, included in the received message.

After concluding the user's boarding at step 703, the communication service providing server 300 compares the mobile device user's boarding time with a time of the mobile device user exiting another transportation system. When the server 300 detects that the time difference is within a preset period of time (e.g., 30 minutes), it concludes that the mobile device user has transferred from another transportation system to the transportation system 200.

The communication service providing server 300 transmits a boarding completion message to the mobile device 100 at step 704. The boarding completion message may include a boarding location, a boarding time, information as to whether a mobile device user transfers, and a message asking a mobile device user whether to make a decision to board a transportation system. When the mobile device user has decided to board the transportation system, the mobile device 100 transmits, to the server 300, a message indicating the user's boarding decision.

When the user of the mobile device 100 exits the transportation system 200, a disconnection is made between the mobile device 100 and the AP 230 of the transportation system 200. In that case, the mobile device 100 transmits, to the communication service providing server 300, a message that includes the identification-information regarding the mobile device 100, and the current location information regarding the mobile device 100, excluding the identification-information regarding an AP 230, at a time point that the mobile device 100 disconnects from the AP 230 at step 705. In an exemplary implementation, the mobile device 100 can transmit, to the server 300, a message that includes information indicating that the mobile device 100 is disconnected from the AP 230, the identification-information regarding the mobile device 100, and the current location information regarding the mobile device 100.

The communication service providing server 300 concludes that the user of the mobile device 100 has exited the transportation system 200, via the message transmitted from the mobile device 100 at step 706. That is, the server 300 concludes that the mobile device user has exited the transportation system 200, at a stop corresponding to the current location information regarding the mobile device 100, included in the message received at step 705, and at a time point that the server 300 received the message from the mobile device 100.

The communication service providing server 300 calculates the transportation fare to charge the mobile device 100, via the locations of the mobile device user boarding and exiting the transportation system 200 at step 707. In a case where the user of the mobile device 100 transfers from one form of transportation to another, the server 300 can calculate the transportation fare to charge the mobile device 100, by applying the transfer transportation fare rate thereto.

The communication service providing server 300 creates the transportation fare charge message based on the calculated transportation fare, and transmits it to the mobile device 100 at step 708. The user of the mobile device 100 can determine and pay the transportation fare, via the message.

In an exemplary implementation, the mobile device 100 can transmit, to the communication service providing server 300, a message that includes the identification-information, the current location information, and the identification-information regarding the AP 230 installed to the transportation system 200, each time that the mobile device 100 passes by certain locations (e.g., stops). The server 300 determines whether the identification-information regarding the AP 230 is included in the received message. When the server 300 ascertains that the identification-information regarding the AP 230 is included in the received message, it concludes that the user of the mobile device 100 has boarded the transportation system 200. On the contrary, when the server 300 ascertains that the identification-information regarding the AP 230 is not included in the received message, it concludes that the user of the mobile device 100 has exited the transportation system 200.

Figure 8:
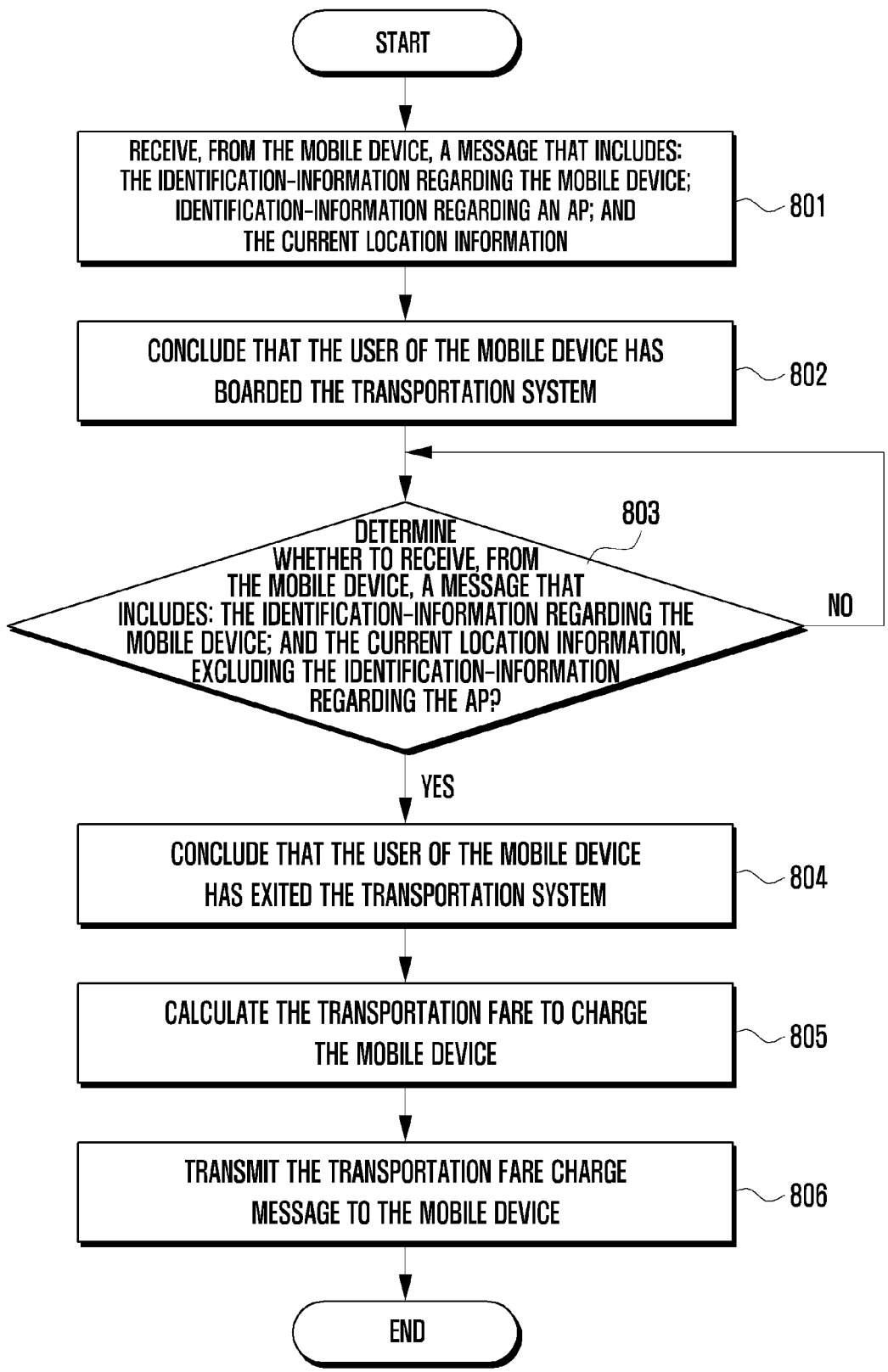
FIG. 8 illustrates a flowchart of a communication service providing server of a public transportation fare payment method according to an exemplary embodiment of the present invention.

FIG. 8 illustrates a flowchart of a communication service providing server of a public transportation fare payment method according to an exemplary embodiment of the present invention.

Referring to FIG. 8, the controller 330 of the communication service providing server 300, short for a server's controller, receives, via the RF communication unit 310, from the mobile device 100, a message that includes the identification-information regarding the mobile device 100, identification-information regarding an AP installed to the transportation system 200, and the current location information regarding the mobile device 100 at step 801. When the mobile device 100 is connected to the AP 230 and transmits, to the server 300, a message that includes the identification-information regarding the mobile device 100, identification-information regarding an AP 230, and the current location information regarding the mobile device 100, the server's controller 330 receives the message via the RF communication unit 310.

At step 802, the server's controller 330 concludes that the user of the mobile device 100 has boarded the transportation system 200. That is, the server's controller 330 ascertains that the identification-information regarding the AP 230 is included in the received message and searches for a transportation system corresponding to the identification-information regarding the AP 230 from the database 320. Thereafter, the server's controller 330 concludes that the user of the mobile device has boarded the transportation system at a stop corresponding to the current location information regarding the mobile device 100, included in the message, and at a time point that it received the message from the mobile device 100.

Thereafter, the server's controller 330 determines whether to receive, via the RF communication unit 310, from the mobile device 100, a message that includes the identification-information regarding the mobile device 100, and the current location information regarding the mobile device 100, excluding the identification-information regarding the AP 230 at step 803. Alternatively, the server's controller 330 may determine whether to receive, via the RF communication unit 310, from the mobile device 100, a message that includes information indicating that the mobile device 100 is disconnected from the AP 230, the identification-information regarding the mobile device 100, and the current location information regarding the mobile device 100. When the user of the mobile device has exited the transportation system 200, a disconnection is made between the mobile device 100 and the AP 230 of the transportation system 200. In that case, the mobile device 100 transmits, to the communication service providing server 300, a message that includes the identification-information regarding the mobile device 100, and the current location information regarding the mobile device 100, at a time point that the mobile device 100 disconnects from the AP 230. The server's controller 330 receives the message via the RF communication unit 310, and ascertains that it does not include the identification-information regarding the AP 230.

The server's controller 330 concludes that the user of the mobile device has exited the transportation system at step 804. That is, the server's controller 330 concludes that the user of the mobile device has exited the transportation system at a stop corresponding to the current location information regarding the mobile device 100, included in the message received at step 803, and at a time point that it received the message.

Thereafter, the server's controller 330 calculates the transportation fare to charge the mobile device at step 805. That is, the server's controller 330 detects locations where the user of the mobile device has boarded and exited the transportation system, and calculates the transportation fare to charge the mobile device, considering the distance or the number of stops between the user's boarding and exiting locations.

The server's controller 330 controls the RF communication unit 310 to transmit the transportation fare charge message to the mobile device at step 806. The mobile device 100 receives the transportation fare charge message and pays the transportation fare.

As described above, according to an exemplary implementation of a public transportation fare payment method, when the mobile device connects with the AP installed to the transportation system, it transmits, to the communication service providing server, a message that includes the identification-information, the current location information, and the identification-information regarding the AP. When the mobile device 100 disconnects from the AP, it transmits, to the server, a message excluding the identification-information regarding the AP. The server determines whether the received message includes the identification-information regarding the AP, and concludes that the user of the mobile device has boarded or exited the transportation system, according to the determination. Since the server can detect the user's boarding and exiting locations, it can calculate the transportation fare to charge the mobile device.

Figure 9:
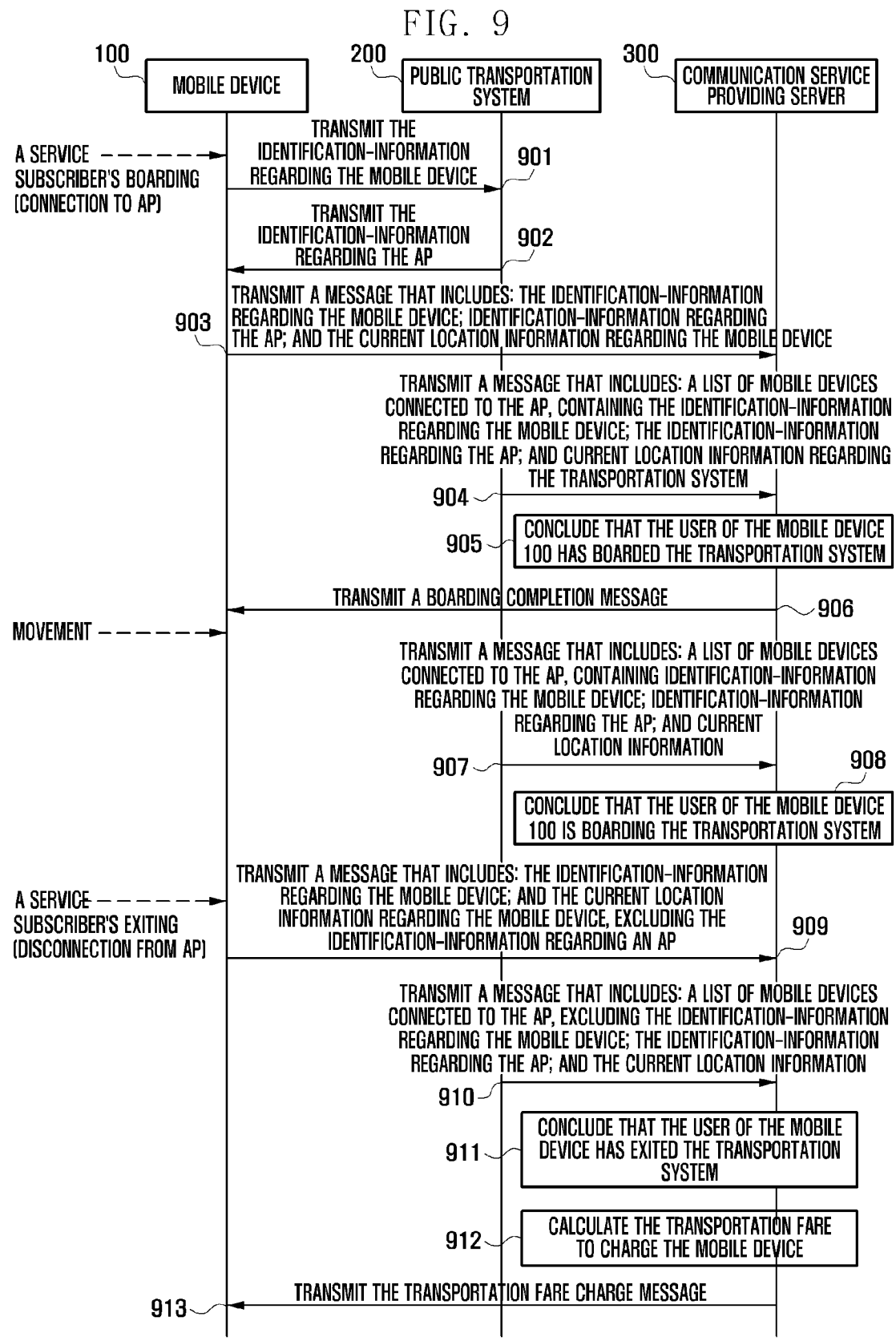
FIG. 9 illustrates a signal flowchart of a public transportation fare payment method according to an exemplary embodiment of the present invention.

FIG. 9 illustrates a signal flowchart of a public transportation fare payment method according to an exemplary embodiment of the present invention.

Referring to FIG. 9, the mobile device has substantially the same components as that as shown in FIG. 6, the transportation system has substantially the same components as that as shown in FIG. 2, and the communication service providing server has substantially the same components as that as shown in FIG. 3.

When a user who has subscribed to a communication service and processes a mobile device 100, i.e., a service subscriber, boards a transportation system 200, the mobile device 100 transmits the identification-information to the transportation system 200 at step 901, and the transportation system 200 transmits the identification-information regarding the AP 230 to the mobile device 100 at step 902. The mobile device 100 controls the short-range communication module to connect with the AP 230. During this connection process, the mobile device 100 transmits the identification-information to the transportation system 200, and in response thereto, the transportation system 200 transmits the identification-information regarding the AP 230 to the mobile device 100.

The mobile device 100 transmits, to a communication service providing server 300, a message that includes the identification-information regarding the mobile device 100, identification-information regarding the AP 230, and the current location information regarding the mobile device 100 at step 903. The transportation system 200 transmits, to the server 300, a message that includes a list of mobile devices connected to the AP 230, including the identification-information regarding the mobile device 100, the identification-information regarding the AP 230, and current location information regarding the transportation system 200 at step 904. That is, at a time point that the mobile device 100 is connected to the AP 230, the mobile device 100 transmits, to the server 300, a message that includes the identification-information regarding the mobile device 100, identification-information regarding the AP 230, and the current location information regarding the mobile device 100. In addition, each time the transportation system 200 arrives at certain locations (e.g., stops), it transmits, to a communication service providing server 300, a message that includes a list of mobile devices connected to the AP 230, the identification-information regarding the AP 230, and current location information regarding the transportation system 200. In an exemplary implementation, the transportation system 200 can transmit messages to the server 300 at time points that it arrives at a stop and departs from the stop, respectively.

The communication service providing server 300 concludes that the service subscriber with the mobile device 100 has boarded the transportation system 200, via the messages transmitted from the mobile device 100 and the transportation system 200 at step 905. The server 300 compares the identification-information regarding the AP 230, included in the message transmitted from the mobile device 100, with that in the message transmitted from the transportation system 200. When the server 300 ascertains that the identification-information regarding the AP 230, included in the message transmitted from the mobile device 100, is identical to that in the message transmitted from the transportation system 200, it concludes that the user of the mobile device 100 has boarded the transportation system 200.

In addition, the server 300 determines whether the identification-information regarding the mobile device 100, included in the message transmitted from the mobile device 100, is included in the list of mobile devices connected to the AP 230 included in the message transmitted from the transportation system 200. When the server 300 ascertains that the identification-information is included in the list, it concludes that the user of the mobile device 100 has boarded the transportation system 200.

Additionally, the server 300 compares the current location information regarding the mobile device 100 with that of the transportation system 200. When the server 300 ascertains that the current location information regarding the mobile device 100 is identical to that of the transportation system 200, it concludes that the user of the mobile device 100 has boarded the transportation system 200.

Alternatively, in an exemplary implementation, the server 300 can employ the three conditions described above to determine whether the user of the mobile device 100 boards the transportation system 200. That is, when the server 300 detects that the three conditions are satisfied, it concludes that the user of the mobile device 100 has boarded the transportation system 200.

In an exemplary implementation, after concluding that the mobile device user has boarded the transportation system 200, it can compare the mobile device user's boarding time with a time of the mobile device user exiting another transportation system. When the server 300 detects that the time difference is within a preset period of time (e.g., 30 minutes), it concludes that the mobile device user has transferred from another transportation system to the transportation system 200.

The communication service providing server 300 transmits a boarding completion message to the mobile device 100 at step 906. The boarding completion message may include a boarding location, a boarding time, information as to whether a mobile device user transfers, and a message asking a mobile device user whether to make a decision to board a transportation system. When the mobile device user has made a decision to board the transportation system, the mobile device 100 transmits, to the server 300, a message indicating the user's boarding decision.

Thereafter, the transportation system 200 moves to the next stop. The transportation system 200 transmits a message to the communication service providing server 300 each time that it arrives and departs at and from stops at step 907. The message includes a list of mobile devices connected to the AP 230, including identification-information regarding the mobile device 100, identification-information regarding the AP 230, and current location information regarding the transportation system 200. Since the user of the mobile device 100 is being boarded in the transportation system 200 and simultaneously the mobile device 100 is being connected to the AP 230 of the transportation system 200, the transportation system 200 transmits, to the communication service providing server 300, the list of mobile devices connected to the AP 230, including the identification-information regarding the mobile device 100.

In an exemplary implementation, each time that the mobile device 100 passes by stops, it can measure the current location via the location measurement module, and transmit, to the communication service providing server 300, a message that includes the identification-information regarding the AP 230, the identification-information regarding the mobile device 100, and information regarding the measured current location of the mobile device 100.

The communication service providing server 300 concludes that the user of the mobile device 100 is boarding the transportation system 200, via the message transmitted from the transportation system 200 at step 908. That is, the server 300 ascertains that the list of mobile devices connected to the AP 230 includes the mobile device 100, and concludes that the user of the mobile device 100 is boarding the transportation system 200. Since the transportation system 200 moves, its current location information is continuously altered. This makes the server 300 update the current location of the mobile device 100 in the database, by reflecting the current location information regarding the transportation system 200. The mobile device 100 can measure its current location in real-time. When the mobile device 100 arrives at a certain stop, it transmits, to the server 300, a message that includes the identification-information regarding the AP 230, the identification-information regarding the mobile device 100, and the current location information regarding the mobile device 100. The server 300 can update the location information in the database, via the message transmitted from the mobile device 100.

When the user of the mobile device 100 exits the transportation system 200, a disconnection is made between the mobile device 100 and the AP 230 of the transportation system 200. In that case, the mobile device 100 transmits, to the communication service providing server 300, a message that includes the identification-information regarding the mobile device 100, and the current location information regarding the mobile device 100, excluding the identification-information regarding an AP 230, at a time point that the mobile device 100 disconnects from the AP 230 at step 909. In addition, the transportation system 200 transmits, to the server 300, a message that includes a list of mobile devices connected to the AP 230, excluding the identification-information regarding the mobile device 100, the identification-information regarding the AP 230, and the current location information regarding the transportation system 200 at step 910.

The communication service providing server 300 determines whether the user of the mobile device 100 has exited the transportation system 200, via the messages transmitted from the mobile device 100 and the transportation system 200 at step 911. The server 300 compares the identification-information regarding the mobile device 100, included in the message transmitted from the mobile device 100, with that of the mobile device 100 removed from the list of mobile devices connected to the AP 230, included in the message transmitted from the transportation system 200. When the server 300 ascertains that the identification-information regarding the mobile device 100, included in the message transmitted from the mobile device 100, is identical to that of the mobile device 100 removed from the list included in the message transmitted from the transportation system 200, it concludes that the user of the mobile device 100 has exited the transportation system 200.

The communication service providing server 300 calculates transportation fare to charge the mobile device 100, via the locations of the mobile device user boarding and exiting the transportation system 200 at step 912. In a case where the user of the mobile device 100 transfers between stops, the server 300 can calculate the transportation fare to charge the mobile device 100, by applying the transfer transportation fare rate thereto.

The communication service providing server 300 creates the transportation fare charge message based on the calculated transportation fare, and transmits it to the mobile device 100 at step 913. The user of the mobile device 100 can then determine and pay the transportation fare, via the message.

Figure 10:
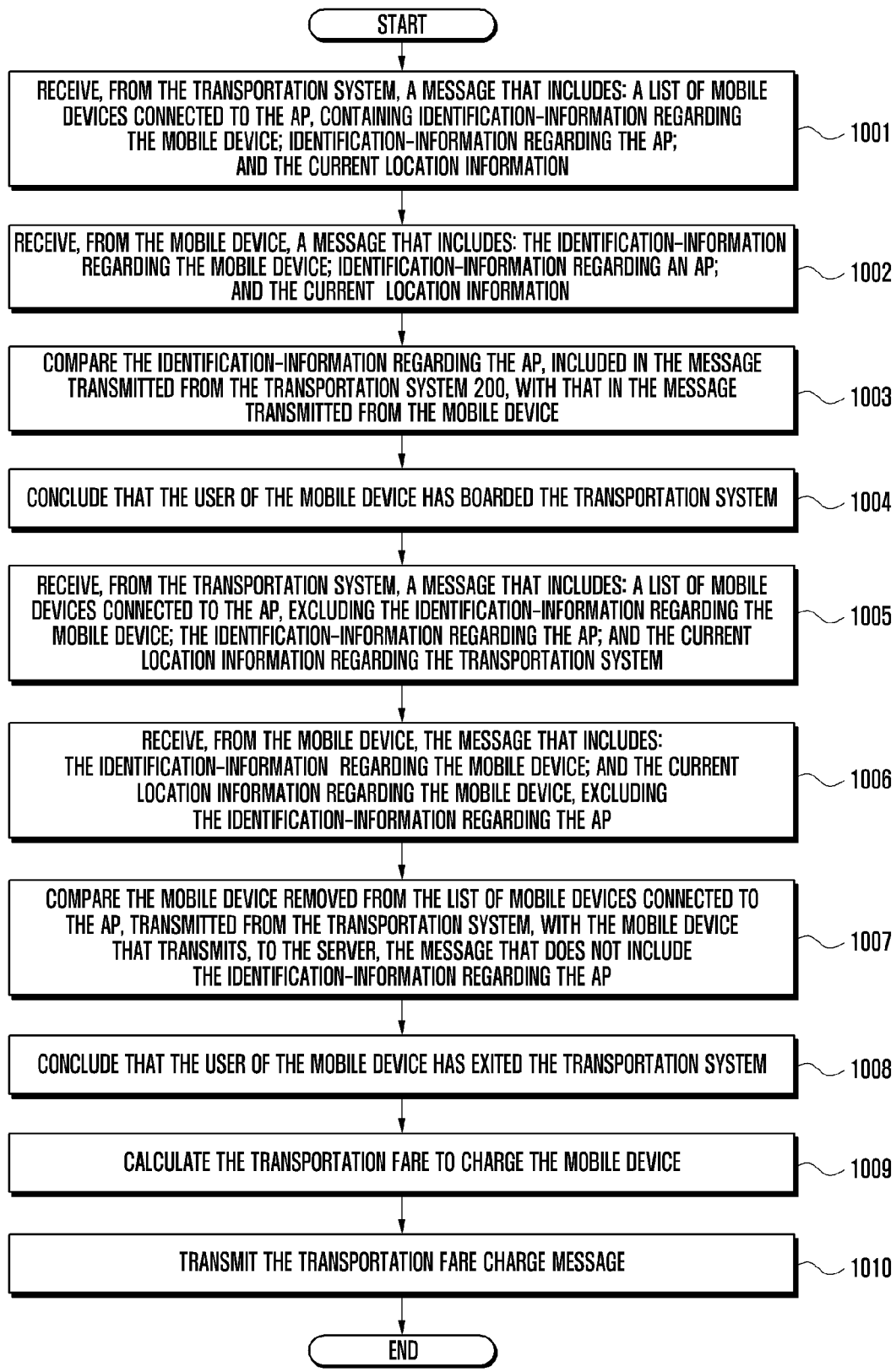
FIG. 10 illustrates a flowchart of a communication service providing server of a public transportation fare payment method according to an exemplary embodiment of the present invention.

FIG. 10 illustrates a flowchart of a communication service providing server of a public transportation fare payment method according to an exemplary embodiment of the present invention.

Referring to FIG. 10, the controller 330 of the communication service providing server 300, short for a server's controller, receives, via the RF communication unit 310, from the transportation system 200, a message that includes a list of mobile devices connected to the AP 230, including identification-information regarding the mobile device 100, identification-information regarding the AP 230, and the current location information regarding the transportation system 200 at step 1001. The transportation system 200 transmits the message to the server 300 at a time point that it arrives at a certain location (e.g., a stop) or departs from the location. The server's controller 330 receives the message via the RF communication unit 310.

The server's controller 330 receives, via the RF communication unit 310, from the mobile device 100, a message that includes the identification-information regarding the mobile device 100, identification-information regarding an AP 230, and the current location information regarding the mobile device 100 at step 1002. The mobile device 100 transmits the message to the server 300 when it is connected to the AP 230 installed to the transportation system 200. The server's controller 330 receives the message via the RF communication unit 310.

In an exemplary implementation, the server's controller 330 may receive a message from the mobile device 100 and a message from the transportation system 200.

The server's controller 330 compares the identification-information regarding the AP 230, included in the message transmitted from the transportation system 200, with that in the message transmitted from the mobile device 100 at step 1003.

In an exemplary implementation, the server's controller 330 may determine whether the identification-information regarding the mobile device 100, included in the message transmitted from the mobile device 100, is included in the list of mobile devices connected to the AP 230, included in the message transmitted from the transportation system 200.

When the server's controller 330 ascertains that the identification-information regarding the AP 230, included in the message transmitted from the transportation system 200, is identical to that in the message transmitted from the mobile device 100, or the identification-information regarding the mobile device 100, included in the message transmitted from the mobile device 100, is included in the list of mobile devices connected to the AP 230, included in the message transmitted from the transportation system 200, it concludes that the user of the mobile device 100 has boarded the transportation system 200 at step 1004. In that case, the server's controller 330 concludes that the user of the mobile device has boarded the transportation system 200 at a stop corresponding to the current location information regarding the transportation system 200, included in the message transmitted from the transportation system 200, and a time point that it received the message from the transportation system 200. Alternatively, the server's controller 330 may conclude that the user of the mobile device has boarded the transportation system 200 at a stop corresponding to the current location information regarding the mobile device 100, included in the message transmitted from the mobile device 100, and a time point that it received the message from the mobile device 100.

When the user of the mobile device 100 exits the transportation system 200, a disconnection is made between the mobile device 100 and the AP 230 installed to the transportation system 200. At a time point the transportation system 200 departs from a certain stop, it creates a message and transmits it to the communication service providing server 300. The message includes a list of mobile devices connected to the AP 230, the identification-information regarding the AP 230, and the current location information regarding the transportation system 200. Since the mobile device 100 is disconnected from the AP 230 when the transportation system 200 departs from a stop, the identification-information regarding the mobile device 100 is removed from the list of mobile devices connected to the AP 230. The server's controller 330 receives, via the RF communication unit 310, from the transportation system 200, a message that includes a list of mobile devices connected to the AP 230, excluding the identification-information regarding the mobile device 100, the identification-information regarding the AP 230, and the current location information regarding the transportation system 200, at step 1005.

When the mobile device 100 disconnects from the AP 230 of the transportation system 200, it creates a message that includes its identification-information and its current location information, excluding the identification-information regarding the AP 230, and transmits it to the communication service providing server 300. The server's controller 330 receives via the RF communication unit 310 from the mobile device 100 the message that includes the identification-information regarding the mobile device 100, and the current location information regarding the mobile device 100, excluding the identification-information regarding the AP 230 at step 1006.

In an exemplary implementation, the server's controller 330 may receive, via the RF communication unit 310, from the mobile device 100, a message that includes information indicating that the mobile device 100 is disconnected from the AP 230, the identification-information regarding the mobile device 100, and the current location information regarding the mobile device 100.

The server's controller 330 compares the mobile device removed from the list of mobile devices connected to the AP 230, transmitted from the transportation system 200, with the mobile device that transmits, to the server 300, the message that does not include the identification-information regarding the AP 230 at step 1007.

When the server's controller 330 ascertains that the mobile device removed from the list is identical to the mobile device that transmitted the message that does not include the identification-information regarding the AP 230 to the server at step 1007, it concludes that the user of the mobile device has exited the transportation system 200 at step 1008. That is, the server's controller 330 concludes that the user of the mobile device has exited the transportation system at a stop corresponding to the current location information regarding the transportation system 200, included in the message received at step 1005, and at a time point that it received the message. Alternatively, the server's controller 330 concludes that the user of the mobile device has exited the transportation system at a stop corresponding to the current location information regarding the mobile device 100, included in the message received at step 1006, and at a time point that it received the message.

Thereafter, the server's controller 330 calculates the transportation fare to charge the mobile device at step 1009. That is, the server's controller 330 detects locations where the user of the mobile device has boarded and exited the transportation system, and calculates the transportation fare to charge the mobile device, considering the distance or the number of stops between the user's boarding and exiting locations.

The server's controller 330 controls the RF communication unit 310 to transmit the transportation fare charge message to the mobile device at step 1010. The mobile device 100 receives the transportation fare charge message, so that the user determines and pays the transportation fare.

As described above, according to an exemplary implementation of a public transportation fare payment method, the communication service providing server receives the messages from the mobile device and the transportation system, and compares the identification-information regarding the mobile device, in the message transmitted from the mobile device, with the identification-information regarding the AP installed to the transportation system, so that it can detect the locations where the user of the mobile device has boarded and exited the transportation system. Since the server can detect the mobile device user's boarding and exiting locations, it can easily calculate the transportation fare to charge the mobile device.

As described above, the method and system according to exemplary embodiments of the present invention extend the range of payment place in a public transportation system, so that users can rapidly and easily pay a public transportation fare via their mobile devices. This can reduce users waiting time for boarding public transportation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for paying a public transportation fare via a mobile device, the method comprising:
transmitting, by the transportation system, when the mobile device is connected to an Access Point (AP) installed to the transportation system, a first message to a communication service providing server, wherein the first message includes a list of mobile devices connected to the AP, including the mobile device, identification-information regarding the AP, and current location information regarding the transportation system;
concluding, by the communication service providing server, that a user of the mobile device has boarded the transportation system when the communication service providing server receives the first message;
transmitting, by the transportation system, when the mobile device is disconnected from the AP, a second message to the communication service providing server, wherein the second message includes the list of mobile devices connected to the AP, excluding the mobile device, the identification-information regarding the AP, and the current location information regarding the transportation system;
concluding, by the communication service providing server, that the user of the mobile device has exited the transportation system when the communication service providing server receives the second message; and
calculating, by the communication service providing server, the transportation fare to be charged to the mobile device based on the current location information regarding the transportation system of the first message and the second message; and
transmitting a transportation fare charge message to the mobile device.

2. The method of claim 1, wherein transmitting the first message comprises:
measuring, by the transportation system, a current location of the transportation system in real-time; and
transmitting, by the transportation system, when the transportation system has arrived at a certain location, the first message to the communication service providing server, wherein the first message includes the current location information regarding the transportation system.

3. The method of claim 1, wherein concluding that the user of the mobile device has boarded the transportation system comprises:
concluding, by the communication service providing server, that the user of the mobile device is moving by the transportation system.

4. The method of claim 1, wherein concluding that the user of the mobile device has boarded the transportation system comprises:
calculating, by the communication service providing server, a time difference between a time point that the user of the mobile device exited another transportation system and a time point that the user boarded the transportation system;
determining, by the communication service providing server, whether the time difference is equal to or less than a preset period of time; and
concluding, by the communication service providing server, that the user of the mobile device has transferred from another transportation system to the transportation system when the time difference is equal to or less than a preset period of time.

5. The method of claim 4, wherein calculating the transportation fare comprises:
applying, by the communication service providing server, a transfer transportation fare rate to the calculation of the transportation fare when the user of the mobile device has transferred.

6. The method of claim 1, wherein concluding that the user of the mobile device has exited the transportation system comprises:
ascertaining, by the communication service providing server, that the mobile device is excluded from the list of mobile devices connected to the AP, included in the received second message; and
concluding, by the communication service providing server, that the user of the mobile device has exited the transportation system at a certain location corresponding to the current location information included in the second message.

7. The method of claim 1, further comprising:
transmitting, by the communication service providing server, a boarding completion message to the mobile device.

8. A method for paying a public transportation fare via a mobile device, the method comprising:
transmitting, by the mobile device, when the mobile device is connected to an Access Point (AP) installed to a transportation system, a first message to a communication service providing server, wherein the first message includes an identification-information regarding the mobile device, identification-information regarding the AP, and current location information regarding the mobile device;
concluding, by the communication service providing server, when the communication service providing server receives the first message, that a user of the mobile device has boarded the transportation system;
transmitting, by the mobile device, when the mobile device is disconnected from the AP, a second message to the communication service providing server, wherein the second message includes the identification-information regarding the mobile device, identification information regarding the AP, and the current location information regarding the mobile device;

concluding, by the communication service providing server, that the user of the mobile device has exited the transportation system when the communication service providing server receives the second message; and calculating, by the communication service providing server, the transportation fare based on the current location information regarding the mobile device of the first message and the second message to charge the mobile device and transmitting a transportation fare charge message to the mobile device.

9. A method for paying a transportation fare of a mobile device, the method comprising:

transmitting, by the mobile device, when the mobile device is connected to an Access Point (AP) installed to a transportation system, a first message to a communication service providing server, wherein the first message includes the identification-information regarding the mobile device, identification-information regarding the AP, and current location information regarding the mobile device;

transmitting, by the mobile device, when the connection to the AP is disconnected, a second message to the communication service providing server, wherein the second message includes the identification-information regarding the mobile device, the current location information regarding the mobile device, and the identification-information regarding the AP, wherein the first message and the second message are used for calculating the transportation fare of the mobile device by the communication service providing server.

10. The method of claim 9, wherein transmitting the first message comprises:

measuring, by the mobile device, a current location of the mobile device in real-time; and transmitting, by the mobile device, when the mobile device has arrived at a certain location, the first message to the communication service providing server, wherein the first message includes the current location information regarding the device.

11. The method of claim 9, wherein the transportation fare is calculated based on a distance between the current location information of the first message and the current location information of the second message.

12. The method of claim 9, wherein the transportation fare is calculated based on a time difference between a time that a connection to an AP of another transportation system is disconnected and a time that the mobile device is connected to the AP installed to the transportation system.

13. A system for paying a public transportation fare comprising:

a transportation system with an Access Point (AP), a location measurement module, and a wireless network communication module;

a mobile device with a communication module for connecting to the AP; and a communication service providing server, wherein the transportation system transmits a message to the communication service providing server when the transportation system arrives at a certain location, wherein the message comprises a list of mobile devices connected to the AP, identification-information regarding the AP, and the current location information regarding the transportation system, and wherein the communication service providing server ascertains that the user of the mobile device has boarded the transportation system when the mobile device is added to the list of mobile devices connected to the AP, ascertains that the user of the mobile device has exited the transportation system when the mobile device is removed from the list of mobile devices connected to the AP, detects the mobile device user's boarding and exiting locations via the current location, calculates the transportation fare to charge the mobile device via the user's boarding and exiting locations, and transmits a transportation fare payment message to the mobile device.

14. The system of claim 13, wherein the communication service providing server concludes when detecting that the mobile device is added to the list of mobile devices connected to the AP, that the user of the mobile device has boarded the transportation system at a certain location corresponding to the current location information, and when detecting that the mobile device is removed from the list of mobile devices connected to the AP, that the user of the mobile device has exited the transportation system at a certain location corresponding to the current location information.

15. The system of claim 13, wherein the communication service providing server calculates, when detecting that the mobile device is added to the list of mobile devices connected to the AP, the time difference between a time point that the user has exited another transportation system and a time point that it receives the message, and concludes, when the time difference is equal to or less than a preset period of time, that the user has transferred from another transportation system to the transportation system.

16. The system of claim 13, wherein the communication service providing server includes a Radio Frequency (RF) communication unit, a database, and a controller.

17. The system of claim 16, wherein the database stores the current location information regarding the mobile device, and information as to whether the user of the mobile device boards the transportation system.

18. The system of claim 16, wherein the database further stores a list of mobile devices of subscribers who have subscribed to communication services, current location information regarding respective mobile devices, information regarding transportation systems the subscribers have used, information regarding subscribers' boarding or exiting locations, time information regarding subscribers' boarding or exiting times, and information as to whether subscribers have transferred to another form of transportation.

19. The system of claim 16, wherein the controller receives the message from the transportation system via the RF communication unit, and updates the database according to the message.

20. The system of claim 13, wherein the communication service providing server transmits a boarding completion message to the mobile device, wherein the boarding completion message comprises at least one of a boarding location, a boarding time, and information as to whether a mobile device user transfers.

* * * * *